United States Patent
Rohs et al.

[11] Patent Number: 6,152,276
[45] Date of Patent: Nov. 28, 2000

[54] ACTUATION MECHANISM FOR A CLUTCH PRESSURE PLATE WITH AXIAL EFFECT AND DISENGAGEMENT UNIT FOR A MOTOR VEHICLE CLUTCH

[75] Inventors: Ulrich Rohs; Hans Rohs, both of Duren; Dietmar Heidingsfeld, Aachen, all of Germany

[73] Assignee: Rohs-Voigt Patentverwertungsgesellschaft mbH, Düren, Germany

[21] Appl. No.: 09/293,710

[22] Filed: Apr. 16, 1999

[30] Foreign Application Priority Data

Apr. 17, 1998 [DE] Germany ............................ 198 17 171
Apr. 22, 1998 [DE] Germany ............................ 198 17 838
Nov. 3, 1998 [DE] Germany ............................ 198 50 552

[51] Int. Cl.[7] ............................ F16D 13/70; F16D 13/50; F16D 13/74
[52] U.S. Cl. .................................... 192/89.23; 192/89.25; 192/99 A; 192/111 A
[58] Field of Search ................... 192/70.27, 70.3, 192/89.23, 89.25, 99 A, 111 A, 70.24

[56] References Cited

U.S. PATENT DOCUMENTS

| | | | |
|---|---|---|---|
| 447,967 | 3/1891 | Moncrief | 192/70.3 X |
| 465,213 | 12/1891 | Schmitt | 192/70.27 X |
| 840,742 | 1/1907 | Benn | 192/70.3 |
| 1,049,604 | 1/1913 | Rosewarne | 192/70.3 X |
| 1,464,173 | 8/1923 | Fawick | 192/70.3 X |
| 1,760,605 | 5/1930 | Pearmain | 192/70.3 X |
| 1,913,268 | 6/1933 | De Loach . | |
| 5,033,598 | 7/1991 | Tipton . | |
| 5,314,051 | 5/1994 | Marie et al. | 192/89.23 X |
| 5,366,054 | 11/1994 | Cooke et al. | 192/91 A X |
| 5,628,389 | 5/1997 | Wittmann et al. | 192/89.23 X |
| 5,960,920 | 10/1999 | Brim et al. | 192/89.23 X |

*Primary Examiner*—Rodney H. Bonck
*Attorney, Agent, or Firm*—Collard & Roe, P.C.

[57] ABSTRACT

A clutch with an axially-effective clutch pressure plate can be made particularly narrow if an actuating element for the clutch pressure plate features a device which is essentially radially driven. This design is for the application of an essentially axially driven force on the clutch pressure plate. Likewise, a motor vehicle clutch can be designed to be narrow if the disengagement unit of the motor vehicle clutch features a disk spring which acts on a clutch pressure plate, and a central disengagement element which is connected with the disk spring. In this case, the disk spring features an area bent in the axial direction, on which a plunger engages, capable of being actuated by the central disengagement element.

9 Claims, 8 Drawing Sheets

Fig. 7a
Fig. 7b
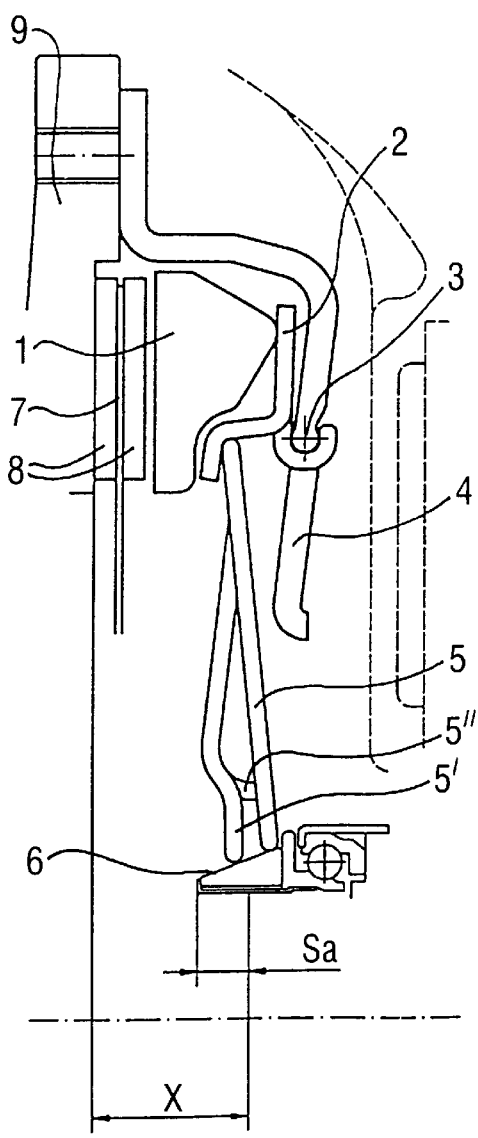
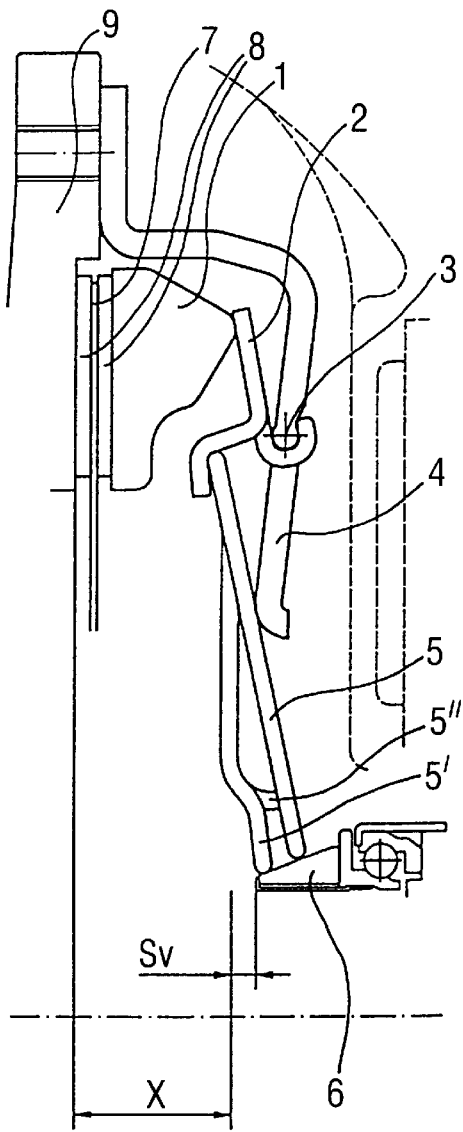

ACTUATION MECHANISM FOR A CLUTCH PRESSURE PLATE WITH AXIAL EFFECT AND DISENGAGEMENT UNIT FOR A MOTOR VEHICLE CLUTCH

BACKGROUND OF THE INVENTION

1. Field of the Invention

This invention relates to an actuation mechanism for a clutch pressure plate with axial effect, and for providing an essentially axially directed force onto the pressure plate, and a disengagement unit for a motor vehicle clutch, with a disk spring taking effect on a pressure plate, and a central disengagement element connected in effect with the disk spring.

2. The Prior Art

Disengagement units of this type for clutch pressure plates include, as a rule, a disk spring tensioned between the clutch pressure plate and a clutch housing, which presses the clutch pressure plate against a friction plate of a clutch. In this situation, the disk spring is mounted on the clutch housing by means of a fixed bearing, and is disengaged by means of a disengagement device taking effect in an axial direction, using tongues pointing inwardly.

Because of the lever lengths of the tongues involved, clutches of this type feature relatively long construction lengths. Added to this construction length incurred by the levers is that because of lining wear, the disk spring traverses through a considerable angular movement, which must likewise be accommodated by the clutch. In addition, the overall arrangement of the clutch features tolerance values between the clutch housing and the central disengagement device which must likewise be compensated for over the construction length.

SUMMARY OF THE INVENTION

An object of the present invention is to allow for the narrowest possible construction design for a clutch of this corresponding type.

As a first solution, the invention provides an actuation mechanism for a clutch pressure plate taking effect axially, wherein the force is essentially applied in an axial direction, and essentially driven in a radial direction.

Because the force is essentially applied in an axial direction, and includes a radial drive unit, a radial displacement of the arrangement is correspondingly effected if a drive of this nature is applied. In this context, the arrangement according to the invention does not require providing an axial construction length for this drive. In addition to this, correspondingly less construction space is required in the axial direction for adjustment for wear. In particular, large levers on the disk spring can be avoided, which likewise contribute to a large construction length.

The invention can be provided, for example, wherein the pressure plate actuation encompasses a force converter and a force generator. Here, the force converter is designed so that it can convert a force with a radial component into a force which is essentially axially directed and applied to the pressure plate.

In particular, the force converter can be a constituent part of the media for the application of the essentially axially directed force, and, for example, encompass an angle lever with a lever arm directed essentially axially, and a lever arm directed essentially radially. As a result, a particularly simple design of the force converter can be provided. It requires only minimal alteration of the inherently known and tried and trusted arrangements according to the state of the art. Here, the known axially-activated lever arm need only be replaced by an angle lever according to the invention.

The force generator in this embodiment provides the radial drive for applying the essentially axially directed force, and is accordingly designed that it can take effect on the force converter with a force which can feature a radial component. The force generator may encompass a plunger, arranged essentially axially, which is capable of actuation by means of a central disengagement element. This allows for a relatively simple design of the force generator.

As a rule, clutch pressure plates of this type are designed to be essentially, radially symmetrical. It is accordingly advantageous if the media for the application of the essentially axially directed force, or the force converter respectively, as well as the force generator feature a corresponding symmetry. Thus, for example, the force converter may be a disk spring, which includes an essentially radially directed section, which provides a radially directed force onto the pressure plate in a known manner. It also provides axially angled areas, wherein an angled lever essentially radially symmetrical, can be realized according to the invention. Likewise, the plunger can be designed as radially symmetrical, for example as a disk spring, and expands radially on actuation.

The invention accordingly provides as a second embodiment a disengagement unit for a motor vehicle clutch with a disk spring taking effect on a pressure plate. It also has a central disengagement element connected with the disk spring, in which the disk spring has an area bent in the axial direction, on which a plunger engages, actuated by the central disengagement element.

As already indicated, it is possible for an essentially radially effective disk spring to be disposed between the disk spring with the area bent in the axial direction and the central disengagement element. This has the effect of a plunger, in that it takes effect radially on the area bent in the axial direction of the disk spring which takes effect on the pressure plate. To this extent, this disk spring, which essentially takes effect radially, functions as a plunger.

The central disengagement element may feature a conical area, on which the plunger comes in contact at least in the loaded state. This arrangement allows for a radial deflection, since the central disengagement element, known from the state of the art, is moved in an axial direction to actuate the disengagement unit. As a result, the conical area is displaced accordingly. This arrangement also allows the plunger to be adjusted when the clutch is subject to wear.

Radial asymmetries of the plunger or at the force generator can offset a central disengagement element or a similar drive unit for the disengagement unit or the clutch pressure plates because between the central disengagement element and the drive respectively, and the plunger and the force generator respectively, a module is provided which provides the conical area with a degree of radial play. A module of this type is also advantageous, irrespective of the other features, for as long as a plunger or a force generator are actuated by a central disengagement element or a drive unit.

This disengagement unit may encompass an adjustment device, which, at least in the non-loaded state of the disengagement unit, exerts a force on the central disengagement unit, so that the plunger can follow the displacement of the disk spring caused by wear. Displacement of this nature because during wear, the clutch pressure plate moves nearer to a carrier disk. As a result, the disk spring is thus displaced. This displacement is counteracted by a disengagement movement of the disk spring.

To be able to follow a displacement of this nature, the plunger requires a certain amount of space. This space can be created by the adjustment device in that it exercises an axial force on the central disengagement element, and thus raises this element slightly from the plunger. The space which is created in this manner can be used by the plunger to follow a displacement incurred by wear.

The disengagement unit and adjustment device can be connected to one another by flexible means. As a result, the relationship between the force applied to the central disengagement element by the adjustment device and the displacement induced by wear, can be set in an appropriate manner as a function of one another.

On the one hand, this flexible connection can be provided for in the area of the disk spring. In the event of the force applied by the adjustment device not being adequate, other flexible elements can be provided for between the adjustment device and the plunger, to provide corresponding force relationships.

The adjustment device can, be connected to the plunger in the area of the disk spring and be in contact at a conical adjustment area of the central section, wherein the conical adjustment area is designed to be blunter than the conical area of the central disengagement element. Thus, the axial force exerted by the adjustment device is somewhat greater than the force exerted by the plunger on the central disengagement element to guarantee slight axial displacement of the central disengagement element.

This slight displacement is sufficient for the plunger to be able to follow a displacement of the disk spring incurred by wear. On the other hand, the adjustment device can also be located directly at the conical area.

BRIEF DESCRIPTION OF THE DRAWINGS

Other objects and features of the present invention will become apparent from the following detailed description considered in connection with the accompanying drawings which disclose the embodiments of the invention. It is to be understood that the drawings are not a definition of the limits of the invention.

In the drawings wherein similar reference characters denote similar elements throughout the several views:

FIG. 7a Shows the arrangement of FIG. 6 in the actuated state;

FIG. 7b Shows the arrangement according to FIG. 6 after wear;

DETAILED DESCRIPTION OF THE PREFERRED EMBODIMENT

Figure 1:
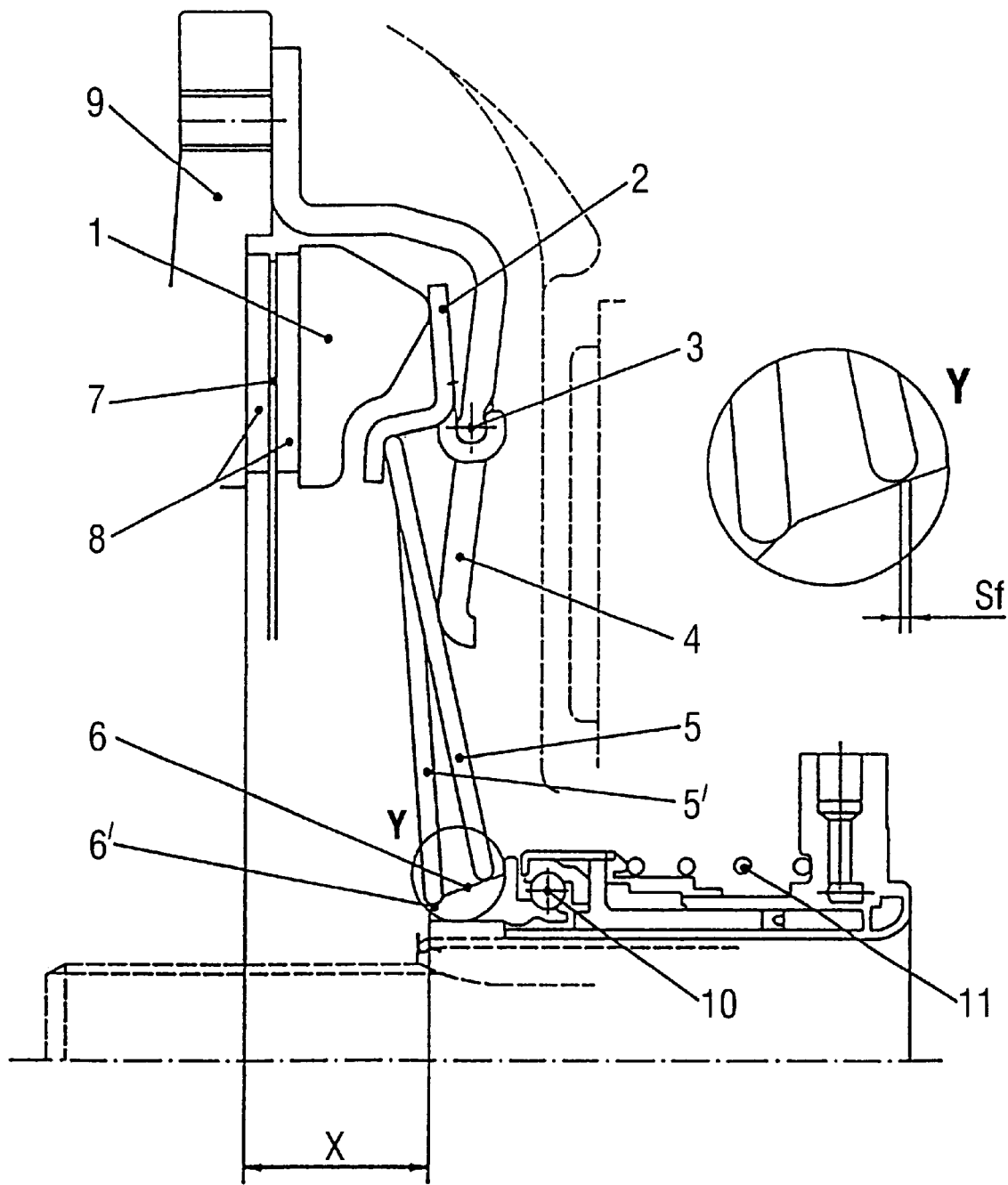
FIG. 1 Shows a clutch pressure plate actuation mechanism, and a disengagement unit according to the invention, in a sectional view.

Referring to FIG. 1, there is shown a carrier disk 7, which is clamped by means of two friction liners 8. These friction liners are clamped between a clutch flange 9 and a pressure plate 1. The initial tension required for this is provided by a disk spring 2, which supports at a point of rotation 3 a clutch housing 4. In this situation, disk spring 2 takes effect on pressure plate 1 with essentially an axially directed force.

Figure 2:
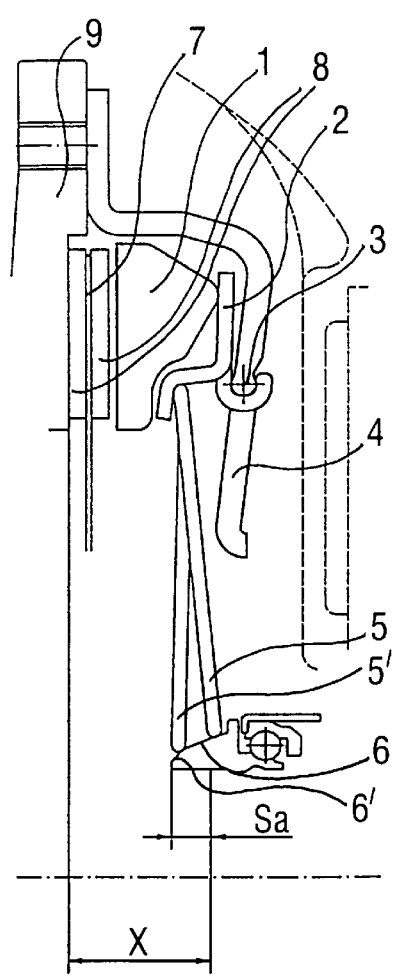
FIG. 2 Shows the arrangement of FIG. 1 in the actuated state.
Figure 4:
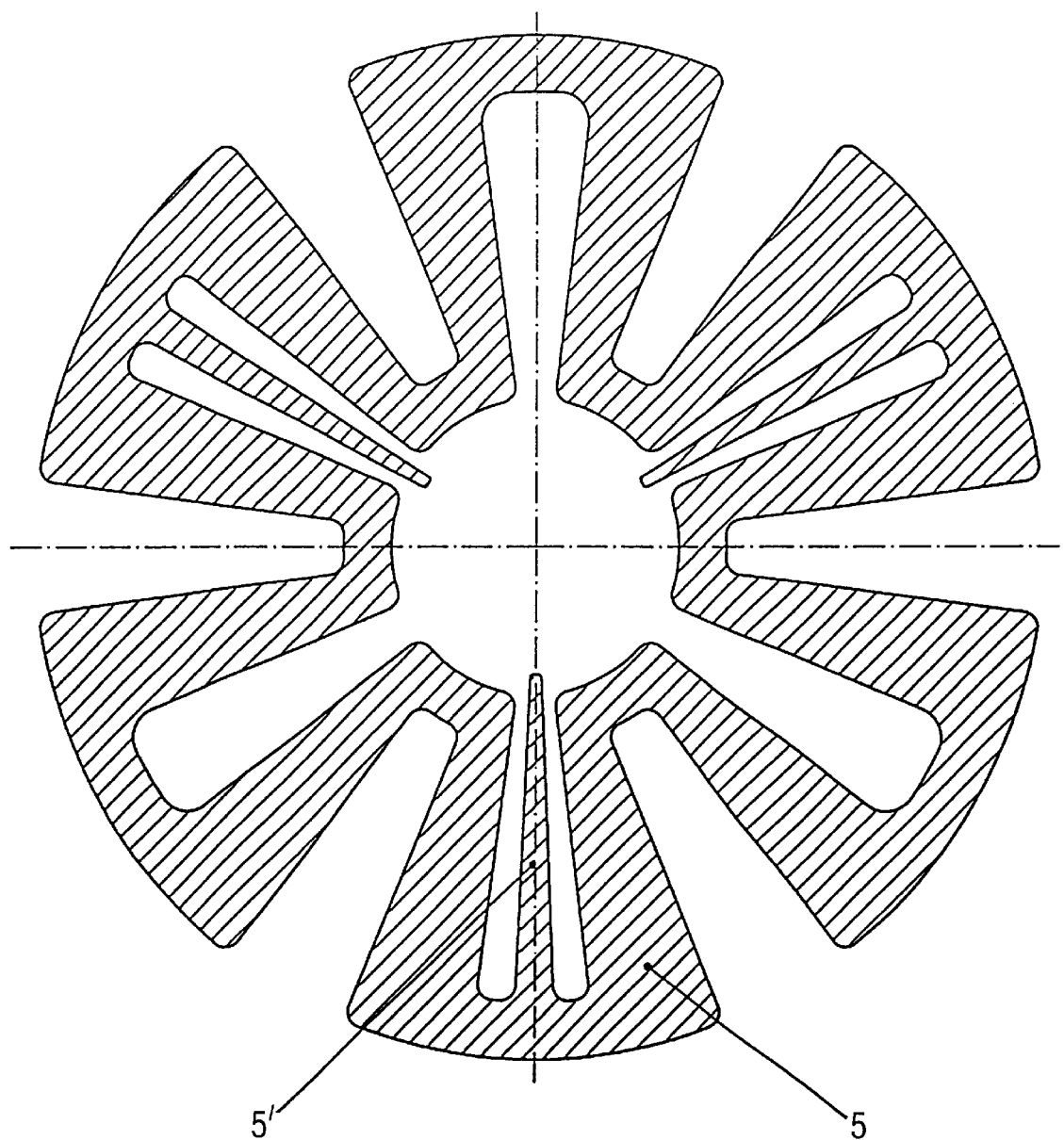
FIG. 4 Shows a disk spring of the arrangement of FIG. 1, in a plan view.

To disengage the clutch, disk spring 2 is disengaged, so that the clamping tension between clutch flange 9 and pressure plate 1 is relieved (see FIGS. 2 and 7a). Disengagement of disk spring 2 is effected by a disk spring 5 (see FIGS. 4 and 8), serving as a plunger, which takes effect by means of a central disengagement element 10 with a radial force on an area of disk spring 2, bent in an axial direction. In this context, the central disengagement element 10 features a conical area 6, which displaces disk spring 5 at its inner radius, axially in the direction of carrier disk 7, by a distance 5a, so that the disk spring angle of disk spring 5 is reduced and disk spring 2, pressing against it, is accordingly deflected.

Disk spring 2 is therefore designed as an angle lever, which is capable of converting a force with a radial component into a force which is essentially directed axially.

Figure 3:
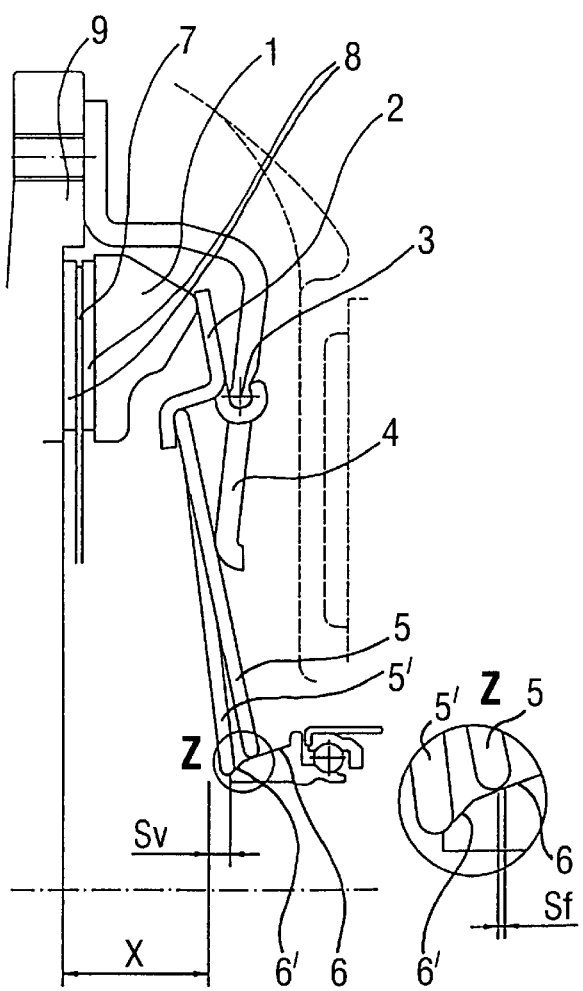
FIG. 3 Shows the arrangement of FIG. 1 after wear.

When the clutch is engaged, disk spring 2 is tensioned until carrier disk 7 is again clamped between clutch flange 9 and pressure plate 1. In this situation, the disk spring 5 disengages for as long as necessary until it is in contact with a part of housing 4. Disk spring 5 also encompasses spring-loaded tongues 5', which pushes central disengagement element 10 by a small distance over the point described earlier, at which disk spring 5 contacts housing 4, so that disk spring 5 is free on its inner diameter. This is represented by the stretch Sf in the sections Z shown in FIG. 3 and Y in FIG. 5. In this way, the disk spring 2, when it features a larger angle setting incurred by wear, can compress the disk spring 5 radially inwards, in which situation the angle setting of the disk spring 5 remains almost unchanged. In this state, conical area 6 or central disengagement element 10 are pressed away from carrier disk 7, so that disk spring 5 is positioned on a smaller diameter of conical area 6.

The result of this is that the force and geometry of this arrangement remain virtually unchanged despite wear to the clutch.

The embodiments represented in the Figures differ from one another by specific design of disk springs 2 and 5 and due to conical area 6 that is used.

With the embodiment represented in FIGS. 1–4, an adjustment device 5' is in contact with a conical adjustment area 6' of conical area 6. In this situation, the conical adjustment area 6' is designed as blunter than the conical area 6, with the result that the adjustment device 5' can take effect with a more favorable force relationship of the central disengagement element. Adjustment device 5' is designed as a single piece with disk spring 5, which serves as a plunger, and is flexibly connected to disk spring 5 in the vicinity of disk spring 2.

Figure 5:
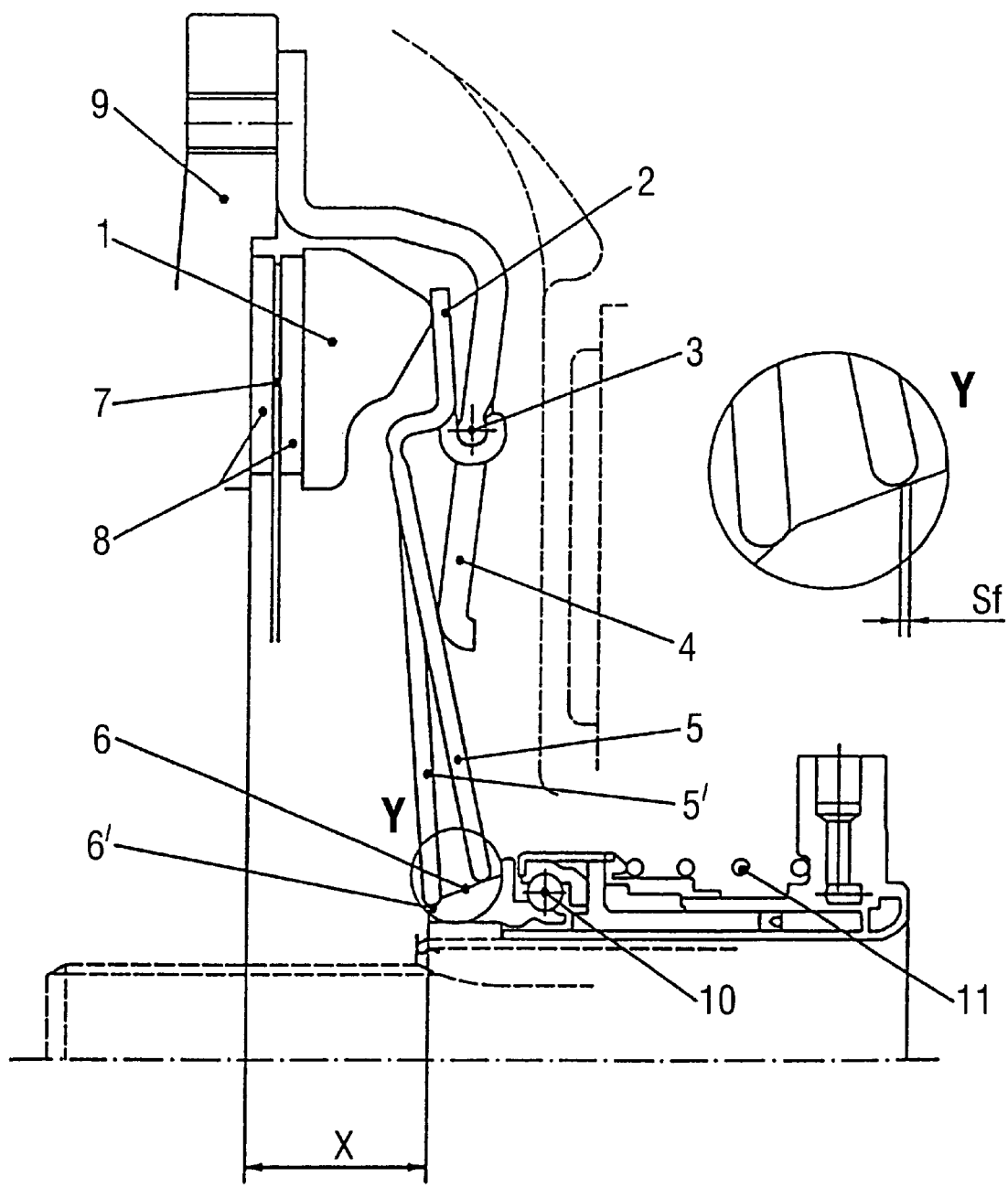
FIG. 5 Shows a further clutch pressure plate actuation mechanism with disengagement unit for a motor vehicle clutch in a similar representation to FIG. 1.

The embodiment shown in FIG. 5 corresponds essentially to those described heretofore. However, in this embodiment, disk springs 2 and 5 and adjustment device 5' are formed as single pieces. Disk spring 5, serving as a plunger, is accordingly not in contact with the bent area of disk spring 2, but is connected with this bent area by means of a narrowing in the cross-section with the angled area.

Figure 6:
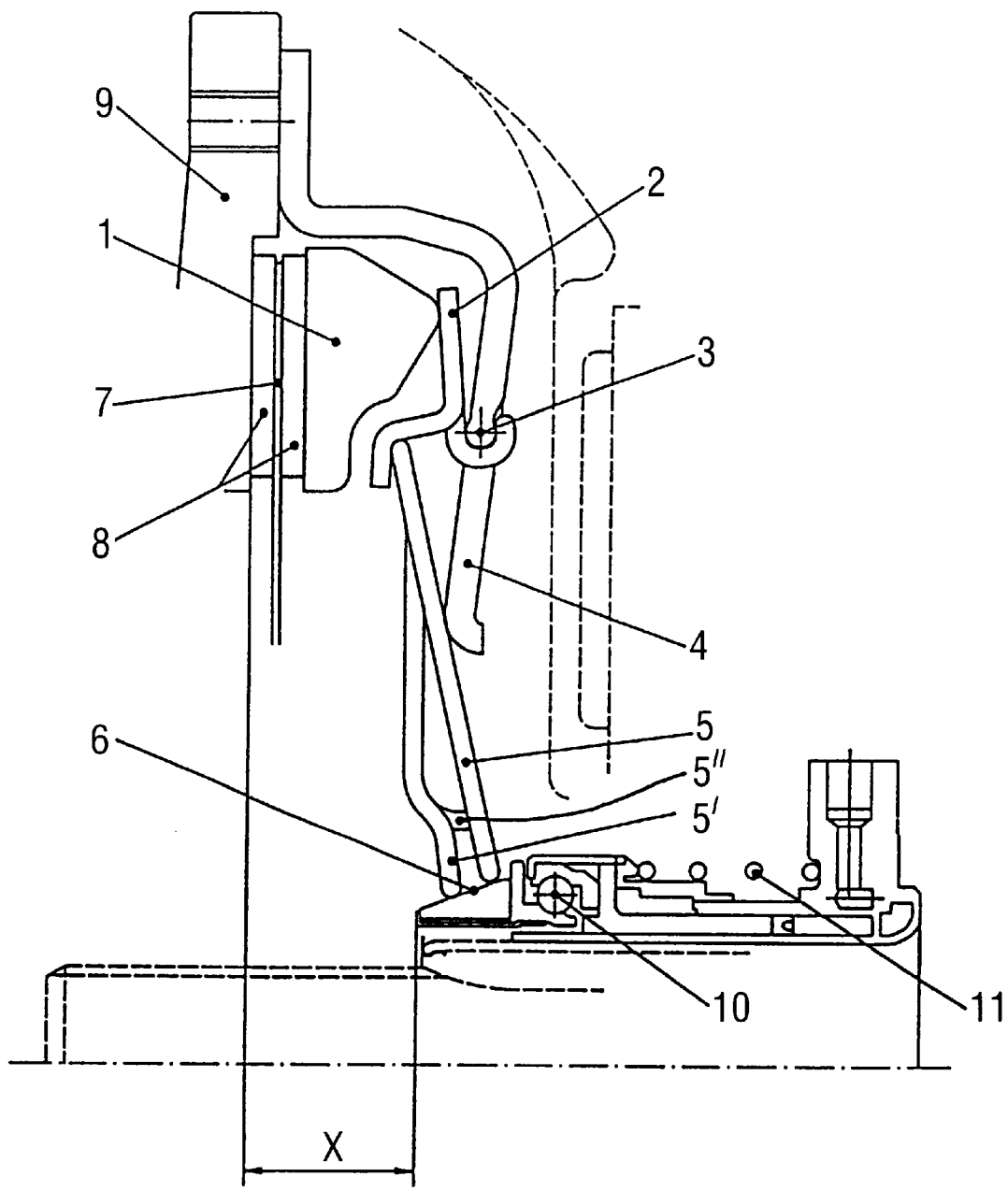
FIG. 6 Shows a third clutch pressure plate actuation mechanism and a further disengagement unit for a motor vehicle clutch, in a similar representation as in FIG. 1.
Figure 8:
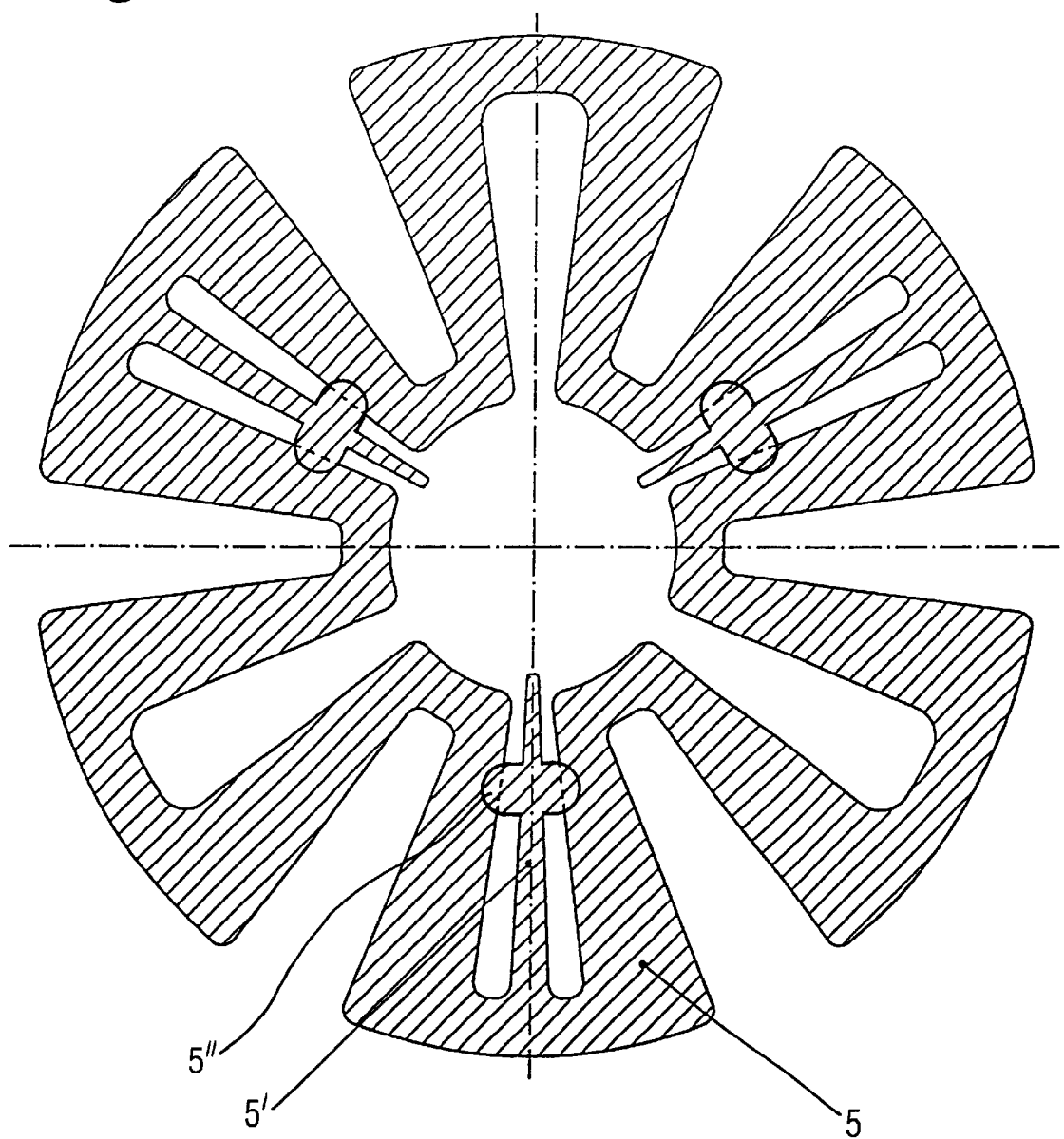
FIG. 8 Shows a disk spring of the arrangement according to FIG. 6.

The embodiment shown in FIGS. 6 to 8 also corresponds essentially to that of FIGS. 1–4. In this embodiment, however, adjustment device 5' is likewise located in the conical area 6, and a conical adjustment area 61 has been done away with. In order that sufficiently high forces be applied to the central disengagement element, and a corresponding adjustment carried out, adjustment device 5' provides flexible elements 5" in its area turned towards central disengagement element 10, serving as spacer elements, which impose a force on adjustment device 5' in the direction of disk spring 5. Adjustment device 5', which has a force applied to it in the direction of disk spring 5, presses central disengagement element 10 or the conical area 6 respectively away from the carrier disk 7', so that disk spring 5 or the plunger, as described heretofore, can follow the displacement of disk spring 2.

In this embodiment, conical area 6 is arranged on a sleeve 10', which is mounted with radial play on a guide element 10" of the central disengagement element. As a result, radial asymmetries of disk spring 5 or of the adjustment device 5' can be compensated for.

The disengagement bearing can also be driven by a lever instead of a hydraulic adjustment.

Figure 9:
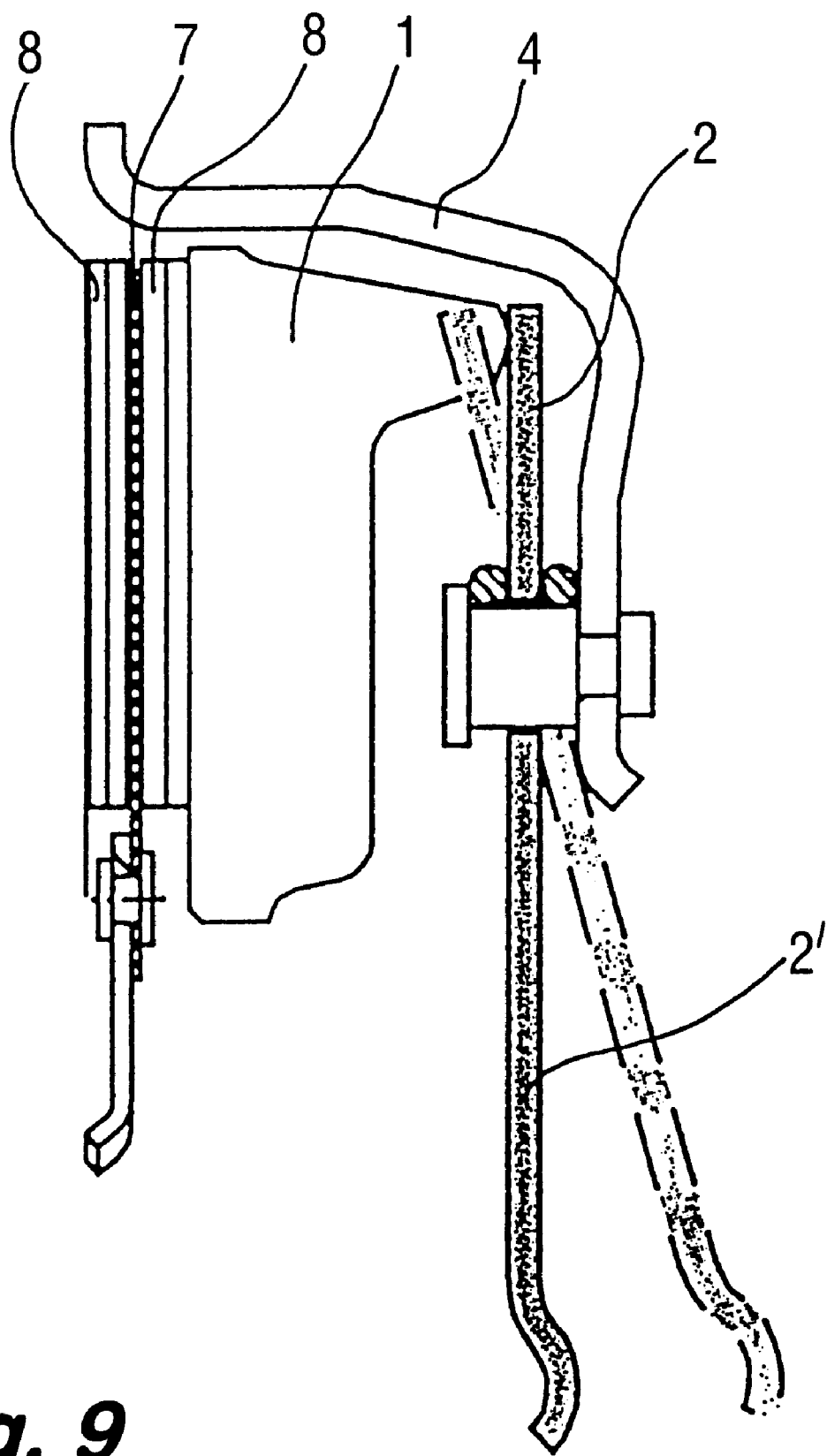
FIG. 9 Shows a known clutch pressure plate actuation device.

As FIG. 9 shows, lever 2' of disk spring 2, according to the state of the art, requires a relatively large construction length for the clutch, which must be retained in particular, due to the adjustment required as a result of wear.

Accordingly, while only a few embodiments of the present invention have been shown and described, it is to be understood that many changes and modifications may be made thereunto without departing from the spirit and scope of the invention as defined in the appended claims.

What is claimed is:

1. A disengagement unit for taking effect on a clutch pressure plate comprising:
   a central disengagement element;
   an actuating element; and
   a disk spring combined with said central element, wherein said disk spring includes an area bent in an axial direction, at which said actuating element engages said disk spring, said actuating element being actuated by said central disengagement element with a force with a radial component.

2. The disengagement unit according to claim 1, wherein said disk spring and said actuating element are designed as one piece.

3. The disengagement unit according to claim 1, comprising a radially effective further disk spring disposed between said disk spring and said central disengagement element.

4. The disengagement unit according to claim 3, wherein said central disengagement element includes a conical section, said actuating element being in contact with the conical section of said disengagement unit at least in the non-loaded state.

5. The disengagement unit according to claim 4, wherein said conical section of said central disengagement element includes a radial play.

6. The disengagement unit according to claim 4, comprising at least one adjustment element, in the non-loaded state, said adjustment element exercising a force on said disengagement unit, so that said actuating element can follow the displacement of said disk spring incurred by wear.

7. The disengagement unit according to claim 6, comprising a plurality of spacers for separating said actuating element and said adjustment element.

8. A disengagement unit for taking effect on a clutch pressure plate comprising:
   a central disengagement element having a conical section;
   an actuating element in contact with said conical section of said central disengagement element in a non loaded state;
   a disk spring combined with said central element;
   a radially effective further disk spring disposed between said disk spring and said central disengagement element; and
   at least one adjustment element in the non loaded state, said adjustment element in contact with said conical section and exercising a force on said disengagement unit, so that said actuating element can follow a displacement of said disk spring incurred by wear;
   wherein said disk spring includes an area bent in an axial direction, at which said actuating element engages said disk spring, said actuating element being actuated by said central disengagement element with a force with a radial component.

9. A disengagement unit for taking effect on a clutch pressure plate comprising:
   a central disengagement element having a conical section;
   an actuating element in contact with said conical section of said central disengagement element in a non loaded state;
   a disk spring combined with said central element;
   a radially effective further disk spring disposed between said disk spring and said central disengagement element; and
   at least one adjustment element in the non loaded state, wherein said adjustment element is in contact with a conical adjustment area, with said conical adjustment area being designed to be blunter than said conical area, and said adjustment element exercising a force on said disengagement unit, so that said actuating element can follow a displacement of said disk spring incurred by wear;
   wherein said disk spring includes an area bent in an axial direction, at which said actuating element engages said disk spring, said actuating element being actuated by said central disengagement element with a force with a radial component.

* * * * *